United States Patent
Moerland et al.

(10) Patent No.: US 12,203,730 B2
(45) Date of Patent: Jan. 21, 2025

(54) INDOOR SHOOTING RANGE

(71) Applicant: Ingenieursbureau en Technische Handelsonderneming Autron B.V., Joure (NL)

(72) Inventors: Jelle Moerland, Joure (NL); Arie Ponsen, Joure (NL)

(73) Assignee: Ingenieursbureau en Technische Handelsonderneming Autron B.V., Joure (NL)

( * ) Notice: Subject to any disclaimer, the term of this patent is extended or adjusted under 35 U.S.C. 154(b) by 673 days.

(21) Appl. No.: 17/282,442

(22) PCT Filed: Sep. 3, 2019

(86) PCT No.: PCT/NL2019/050568
§ 371 (c)(1),
(2) Date: Apr. 2, 2021

(87) PCT Pub. No.: WO2020/071903
PCT Pub. Date: Apr. 9, 2020

(65) Prior Publication Data
US 2021/0381811 A1    Dec. 9, 2021

(30) Foreign Application Priority Data

Oct. 3, 2018  (NL) .................................. 2021750

(51) Int. Cl.
*F41J 11/02*   (2009.01)
*F24F 8/10*    (2021.01)
(Continued)

(52) U.S. Cl.
CPC ............ *F41J 11/02* (2013.01); *F24F 8/10* (2021.01); *F41J 13/00* (2013.01); *F24F 2110/65* (2018.01)

(58) Field of Classification Search
CPC ............ F41J 11/00–13/02; F24F 7/003; F24F 2110/64–65
See application file for complete search history.

(56) References Cited

U.S. PATENT DOCUMENTS

| 4,114,521 A | 9/1978 | Busch |
| 4,164,901 A | 8/1979 | Everett |
| (Continued) | | |

FOREIGN PATENT DOCUMENTS

| KR | 102 009 459 | 8/2019 | |
| NL | 2013641 B1 * | 4/2016 | ............... F41J 11/00 |
| (Continued) | | | |

OTHER PUBLICATIONS

US Department of Health and Human Services, Centers for Disease Control and Prevention, National Institute for Occupational Health and Safety (NIOSH) Alert, "Preventing Occupational Exposures to Lead and Noise at Indoor Firing Ranges," Nov. 2007 (Year: 2007).*

(Continued)

*Primary Examiner* — Jeffrey S Vanderveen
(74) *Attorney, Agent, or Firm* — CASIMIR JONES, S.C.; Brian F. Bradley

(57) ABSTRACT

Indoor shooting range comprising an interior space for firing ammunition, said indoor shooting range comprising: —an air ventilation system arranged for providing said interior space with fresh air; —a detector unit arranged for detecting a concentration of metallic elements, in said interior space, originating from ammunition fired in said interior space of said indoor shooting range; —a control unit, communicatively coupled to said air ventilation system and said detector unit, for controlling said air ventilation system taking into account a detected concentration, by said detector unit, of metallic elements originating from said ammunition fired in said interior space for maintaining said concentration of (Continued)

Figure 1:
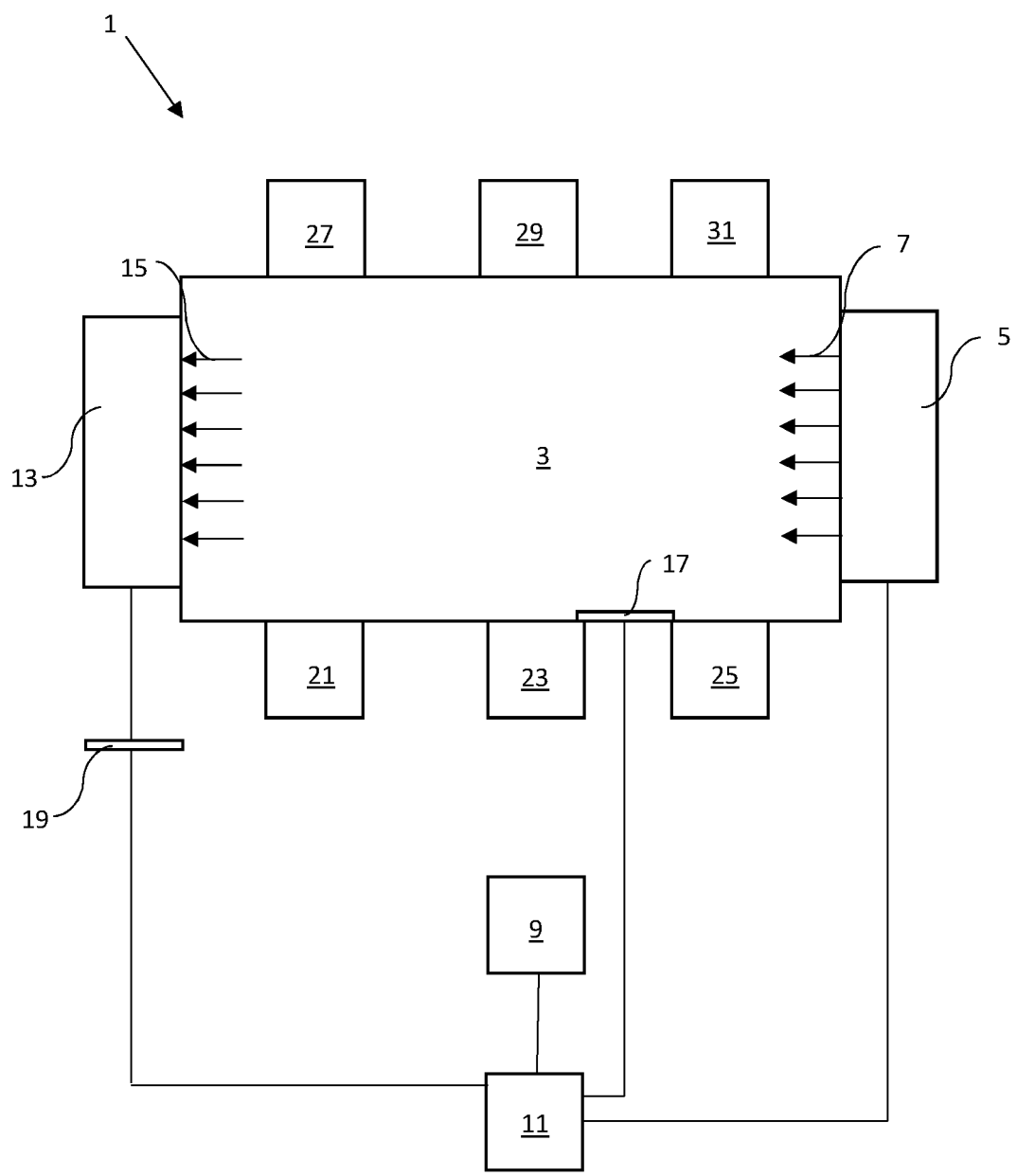

said metallic particles in said interior space below a predetermined value.

19 Claims, 3 Drawing Sheets

(51) Int. Cl.
*F24F 110/65* (2018.01)
*F41J 13/00* (2009.01)

(56) References Cited

U.S. PATENT DOCUMENTS

| | | | |
|---|---|---|---|
| H188 H * | 1/1987 | Thomson | G01N 15/0618 |
| | | | 378/45 |
| 5,389,120 A | 2/1995 | Sewell et al. | |
| 7,838,825 B2 * | 11/2010 | Vakhshoori | G01N 21/65 |
| | | | 250/281 |
| 7,909,331 B2 * | 3/2011 | Halverson | F41J 13/00 |
| | | | 273/404 |
| 8,147,302 B2 * | 4/2012 | Desrochers | F24F 11/63 |
| | | | 702/50 |
| 2009/0126382 A1 * | 5/2009 | Rubino | F24F 8/192 |
| | | | 422/108 |
| 2014/0349564 A1 | 11/2014 | Lamothe | |
| 2018/0168112 A1 | 6/2018 | Yang et al. | |
| 2018/0238571 A1 * | 8/2018 | Joseph | F24F 11/33 |

FOREIGN PATENT DOCUMENTS

| | | | | |
|---|---|---|---|---|
| WO | 2016/059221 | | 4/2016 | |
| WO | WO-2016059221 A1 * | | 4/2016 | F41J 11/00 |
| WO | 2017/194595 | | 11/2017 | |

OTHER PUBLICATIONS

International Search Report, International Patent Application No. PCT/NL2019/050568, mailed Dec. 10, 2019, 4 pages.

* cited by examiner

INDOOR SHOOTING RANGE

The present disclosure relates to an indoor shooting range comprising an interior space for firing ammunition and an air ventilation system arranged for providing said interior space with fresh air.

Indoor shooting ranges are usually construed inside a building structure and provide a closed environment for firing ammunition. Firing ammunition causes a variety of substances to be released into the air. Those released substances may be harmful to people present in the indoor shooting range during or after firing ammunition inside the indoor shooting range.

NL 2013641 discloses a modular shooting range comprising an air ventilation system for providing the shooting range with fresh air. Although this system works well it may be further improved to maintain a relative safe operation condition for people present in the shooting range during and/or after firing of ammunition inside the indoor shooting range.

The objective of the present disclosure is to provide a shooting range that is arranged to maintain a relative safe operation condition for people present in the shooting range during and/or after firing of ammunition inside the indoor shooting range.

The objective is achieved by the indoor shooting range according to the present disclosure. The indoor shooting range according to the present disclosure comprises a detector unit arranged for detecting a concentration of metallic elements, in air in said interior space, originating from ammunition fired in said interior space of said shooting range.

In addition, the indoor shooting range according to the present disclosure comprises a control unit, communicatively coupled to said air ventilation system and said detector unit, for controlling said air ventilation system taking into account a detected concentration, by said detector unit, of metallic elements originating from said ammunition fired in said interior space for maintaining said concentration of said metallic particles in said interior space below a predetermined value.

Within the context of the present disclosure the detector unit may be considered an analysing detector that is arranged for detecting metallic elements and that is arranged for detecting concentrations of said metallic elements.

Providing the indoor shooting range with a detector unit that is communicatively coupled to the control unit and communicatively coupling the air ventilation system to the control unit the supply of fresh air may be changed taking into account detected concentrations of metallic elements. By actively controlling the air ventilation system the supply of fresh air to the interior space may be controlled to increase replacement of air, present in the interior space, comprising a relative high concentration of metallic elements originating from fired ammunition and thereby maintain a relative safe operation condition for people present in the shooting range. Alternatively, upon detecting relative low concentrations of the metallic elements, the supply of fresh air to the interior space may be reduced to reduce energy consumption of the indoor shooting range.

The amount and variety of metallic elements released in the air from firing ammunition may amongst others depend on the brand and type of the ammunition and the weapon used. The metallic elements may for instance originate from the primer, the powder charge, the cartridge case and/or the barrel of the weapon. In addition, the impact of the projectile on a hard object, such as a steel bullet trap, may contribute to the release of metallic elements.

An additional advantage of the indoor shooting range according to the present disclosure is that people may remain inside the interior space for a relative long period at a relative low risk of adverse health effects. The present disclosure at least partly relies on the insight that although the indoor shooting range is provided with an air ventilation system, during use, a relative unsafe operation condition for people present in the shooting range may occur when remaining for a relative long period in the interior space. For limiting the health risks to people present in the interior space, the amount of time spend in the interior space may be restricted and thereby limit the time for practicing firing ammunition.

Moreover, the utilisation of known indoor shooting ranges may be limited for realising air conditions inside the interior space, wherein the metallic elements remain below the predetermined value.

The predetermined value may be a Threshold Limit Value (TLV) prescribed by authorities, wherein the TLV is the maximum allowable concentration value of a substance in the breathing zone of a person. This substance can be a gas, vapour, particle, aerosol or fibre. A TLV is measured over a defined reference period. This period is 15 minutes for a short-term exposure (STEL: Short Term Exposure Limit) and 8 hours for the Threshold Limit Value. The basis for establishing this value is that no negative effects for the health of the persons and their offspring may occur. Not even with repeated exposure for a prolonged period of time, up to a working life long. Threshold Limit Values give clarity for persons about the allowable exposure. TLV's also support enforcement of occupational health and safety rules. With concentrations below the TLV's, no adverse effects for human health are to be expected. Table 1 provides an example of TLV's for an 8 hour exposure of elements that may be released by firing ammunition.

TABLE 1

| Threshold Limit Values for 8 hour exposure | | |
| --- | --- | --- |
| Element | Name | mg/m$^3$ - 8 h |
| Al | Aluminium | 3.72 |
| Ba | Barium | 0.5 |
| Cr | Chrome | 0.5 |
| Cu | Copper | 0.1 |
| Hg | Mercury | 0.02 |
| Mn | Manganese | 1 |
| Ni | Nickel | 0.1 |
| Pb | Lead | 0.15 |
| Sb | Antimony | 0.5 |
| Sn | Tin | 2 |
| Zn | Zinc | 5 |

It is advantageous if said controlling of said air ventilation system comprises controlling a velocity of said fresh air in said interior space.

In this regard it is beneficial if said velocity of said fresh air is in a range of 0.2 meters per second to 0.8 meters per second, preferably in the range of 0.3 meters per second to 0.55 meters per second. An air velocity in this range is beneficial for allowing known training methods for firing ammunition to be used in the interior space. Moreover, an air velocity in this range is beneficial for realising a relative low noise level originating from the air flow through the interior space.

Preferably, said fresh air, in use, flows laminar through said interior space. A laminar flow of fresh air is beneficial for preventing, or at least significantly reducing, the risk of inhalation of the metallic elements during shooting practice. Moreover a laminar air flow is beneficial for realising a relative constant air flow over a cross-section of the interior space.

In an embodiment of the indoor shooting range, said detector unit is arranged for detecting at least one of lead, copper, aluminium, antimony, zinc, tin, manganese, bismuth, iron and nickel elements.

In an embodiment of the indoor shooting range, said detector unit is arranged for detecting the metallic elements of Table 1 at a concentration level lower than the Threshold Limit Value according to Table 1.

Preferably, said indoor shooting range comprises a filter unit for filtering metallic elements from air exhausted from said interior space. This is advantageous for avoiding, or at least significantly reducing, distribution of the metallic elements outside the indoor shooting range.

It is beneficial if said indoor shooting range comprises an indication unit, communicatively coupled to said control unit, arranged for indicating a measure of said detected concentration to a user in said interior space. This is beneficial for allowing a user to be informed about the air condition in the interior space.

In an embodiment of the indoor shooting range according to the present disclosure, said indoor shooting range comprises a pressure detector, communicatively coupled to said control unit, for detecting a pressure drop across said filter unit, wherein said indication unit is arranged for indicating a measure of said pressure drop to a user in said interior space.

In an embodiment of the indoor shooting range according to the present disclosure, said indoor shooting range comprises an air sampling system, communicatively coupled to said detector unit and said control unit, arranged for sampling air at predetermined locations in said interior space. This is beneficial for determining a measure for the concentration of metallic elements at the predetermined locations.

Preferably, a predetermined location of said predetermined locations is such that said air exhausted from said interior space is sampled before said air is exhausted from said interior space and enters said filter unit and wherein said detector unit is coupled for fluid flow with said air sampling system for detecting said concentration of metallic elements in said air sampled at said predetermined location.

Preferably, a further predetermined location of said predetermined locations is such that said air exhausted from said interior space is sampled after said air is exhausted from said interior space and passes said filter unit and wherein said detector unit is coupled for fluid flow with said air sampling system for detecting said concentration of metallic elements in said air sampled at said further predetermined location.

In an embodiment of the indoor shooting range, said detector unit is arranged for detecting said concentration of metallic elements in said air exhausted from said interior space before said air exhausted from said interior space enters said filter unit and for detecting said concentration of metallic elements in said air exhausted from said interior space after said air exhausted from said interior space passed said filter unit. This is beneficial for determining a measure for the removal of metallic elements by the filter unit. A determined measure corresponding to a relative low removal of metallic elements may be used to provide a signal that the filter unit requires cleaning or replacement by a new filter unit.

It is advantageous if the indoor shooting range comprises a person detector system, communicatively coupled to said control unit, for detecting a location of a person in said interior space, wherein said air sampling system is arranged for sampling air at another predetermined location of said predetermined locations in said interior space corresponding with a detected location of a person, by said person detector system. This allows for determining a measure for the concentration of metallic elements at the location of the person or persons detected in the interior space. This is beneficial for maintaining a relative safe operation condition in the direct vicinity of the people present in the shooting range during and/or after firing of ammunition inside the indoor shooting range. The inventors have noted that the concentration of metallic elements in the interior space may vary across the interior space. More specifically, it has been observed that the concentration of metallic elements may be relatively high near the person firing the ammunition.

Preferably, said control unit is arranged for controlling of said air ventilation system at a rate of once per minute, preferably continuously. This is beneficial for maintain a relative safe operation condition for people present in the shooting range during and/or after firing of ammunition inside the indoor shooting range. In an embodiment of the indoor shooting range, said control unit is arranged for controlling of said air ventilation system at a rate in the range of once per minute to once per 60 minutes.

In an embodiment of the indoor shooting range, the detector unit comprises an energy-dispersive X-ray spectroscope for said detecting of said concentration of said metallic elements in air in said interior space. It has been found that an energy-dispersive X-ray spectroscope is very advantageous for determining a measure for the concentration of the metallic elements. Moreover, a detector unit comprising an energy-dispersive X-ray spectroscope may be advantageous for realising a relative small and low weight unit that may be carried by a person.

In a practical embodiment of the indoor shooting range according to the present disclosure said indoor shooting range comprises a plurality of interconnecting units, said interconnecting units comprising:
- one front unit being at least substantially open at only one of the opposite long sides thereof, wherein said front unit comprises said air ventilation system for providing said air flow in said interior space,
- one bullet trap unit comprising a bullet trap system arranged for trapping bullets fired, said bullet trap unit being at least substantially open at only one of the opposite long sides thereof,
- a plurality of extension units for extending a length of said shooting range, each of said plurality of extension units being at least substantially open at both of the opposite long sides thereof,
- wherein said interconnecting units are connected to each other via said open long sides, and wherein said plurality of extension units are arranged between said front unit and said bullet trap unit thereby forming a substantially closed, air-tight interior space such that said air flow from said air ventilation system is laminar across said interior space.

The indoor shooting range comprising a plurality of interconnecting units is based on the insight that a flexible, non-stationary modular shooting range is provided in case it is construed by a plurality of interconnecting units, i.e. one front unit, one bullet trap unit and a plurality of extension units. Using these different types of units, a modular shooting range may be construed of any length. As such, the indoor shooting range comprising a plurality of interconnecting units is especially advantageous for situations where temporary or semi-permanent shooting ranges are desired, or where special trainings facilities are required. Further, the indoor shooting range comprising a plurality of interconnecting units may be deployed in situations where an existing, indoor, shooting range is being renovated or otherwise cannot be used. The interconnecting units, preferably, are prefabricated units, meaning that these units merely need to be connected to each other for creating said shooting range. As such, in situ, i.e. on the place where the indoor shooting range is to be created, each of the interconnecting units do not need to be assembled as such. The interconnecting units merely need to be connected to each other. Once the interconnecting units are connected to each other, an air-tight interior space is created.

In the context of the present disclosure, at least substantially open at only one of the opposite long sides thereof means, in case of an interconnecting unit, that one of the long sides of the interconnecting unit is removed. This so called open long side is then used for connecting a further interconnecting unit using an open long side of that further interconnecting unit. The term at least substantially open at only one of the opposite long sides thereof further entails that the three sides which are considered not to be open, i.e. the opposite long side, and the two short sides, are substantially closed in such a way that bullets fired cannot penetrate via these sides to the outdoors.

The so called closed sides of the interconnecting units may, for example, comprise a door, window, ventilation vent or the like. Such a door, window, ventilation vent is arranged to be bullet proof.

In this regard it is beneficial if said interconnecting units further comprise a back unit comprising coupling means for coupling said back unit to said bullet trap unit via closed long sides of said bullet trap unit, wherein said back unit comprises an air suction system arranged for suctioning air having said metallic elements generated through said firing of said ammunition in said interior space.

Figure 2:
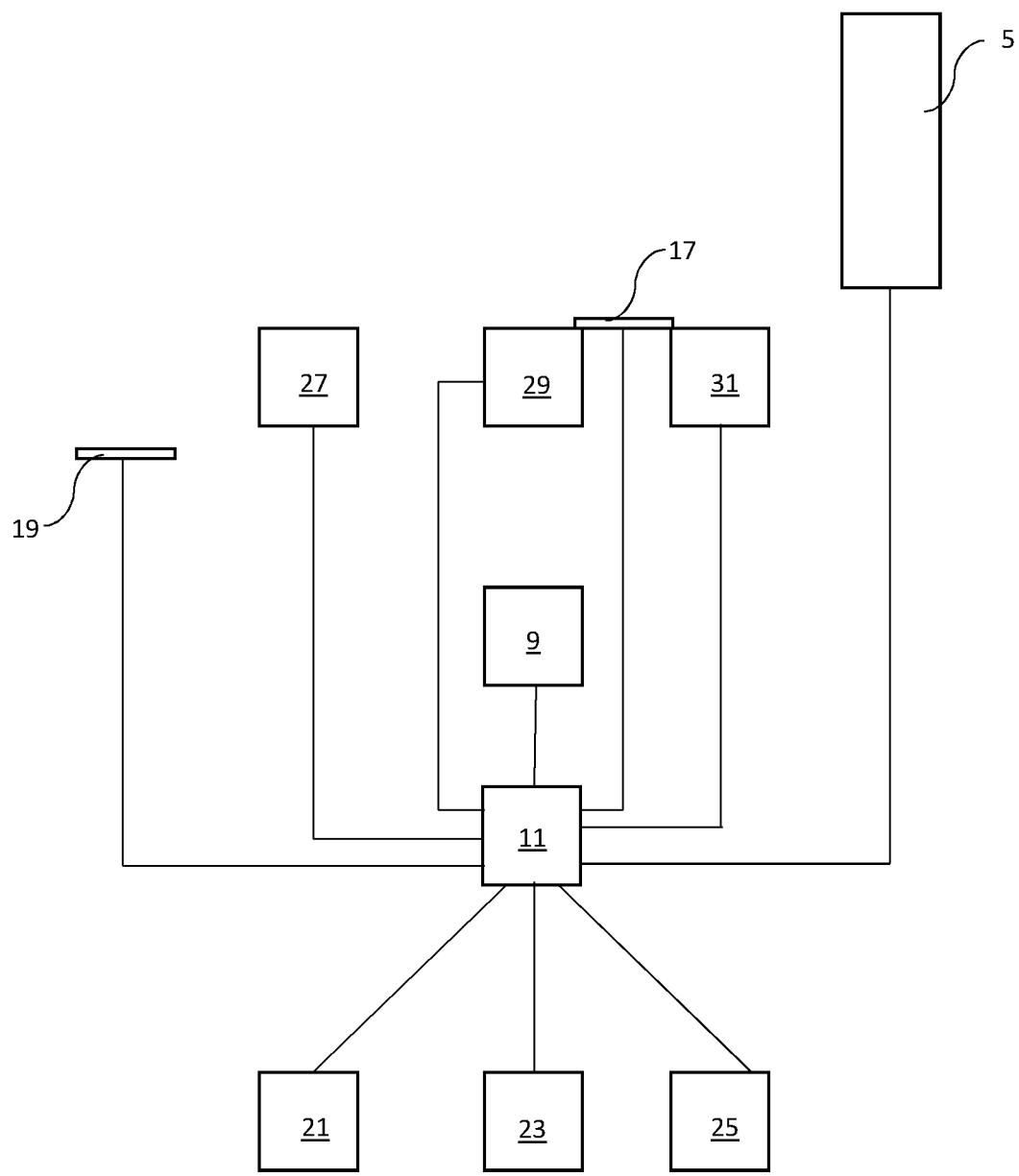
Figure 3:
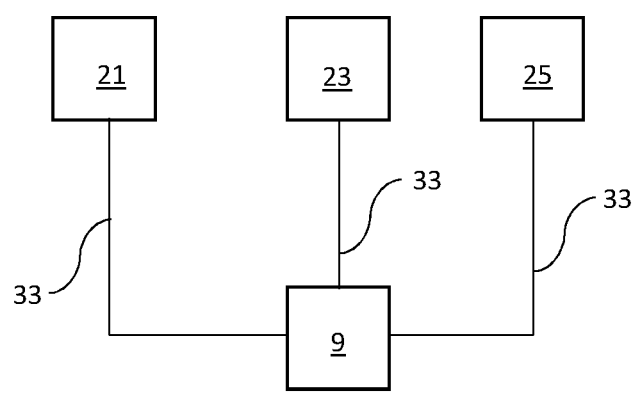

The present disclosure will now be explained by means of a description of a preferred embodiment of an indoor shooting range, in which reference is made to the following schematic figures, in which:

FIG. 1: a cross-section of an indoor shooting range according to the present disclosure is shown;

FIG. 2: elements of the indoor shooting range from FIG. 1 are shown;

FIG. 3: further elements of the indoor shooting range from FIG. 1 are shown.

The indoor shooting range 1 comprises a plurality of interconnecting elongated interconnecting units delimiting an interior space 3 of the indoor shooting range 1. The indoor shooting 1 range is provided with an air ventilation system 5 that draws in fresh ambient air from outside the shooting range 1. The air ventilation system may be provided with a condition unit for conditioning the fresh ambient air, by heating, cooling, moistening or drying the air, before providing fresh air 7 at a first side into the interior space 3. The fresh air 7 is provided such in the interior space 3 that a laminar flow inside the interior space 3 is realized. At a second side of the interior space 3, opposite the first side, air is exhausted from the interior space 3 via a filter unit 13.

The indoor shooting range further comprises an air sampling system and a detector unit 9. The air sampling system comprises air intake nozzles 21, 23, 25. The air intake nozzles 21, 23 and 25 are coupled for fluid flow via tubes 33 to the detector unit 9. The detector unit 9 comprises an energy-dispersive X-ray spectroscope (EDS, EDX, EDXS or XEDS), sometimes called energy dispersive X-ray analysis (EDXA) or energy dispersive X-ray microanalysis (EDXMA) for analysing the air sampled via the air intake nozzles 21, 23, 25. The detector unit is arranged for detecting concentrations of lead, copper, aluminium, antimony, zinc, tin, manganese, bismuth, iron and nickel in the sampled air. In an embodiment of the indoor shooting range 1 a first air intake nozzle is provided such that air exhausted from the interior space 3 may be sampled before passing through said filter unit 13 and a second air intake nozzle is provided such that air may be sampled after passing said filter unit 13. A difference in the concentrations of metallic elements detected by said detector unit 9 between air received via said first intake nozzle and air received via said second intake nozzle may be used as a measure for the operational condition of the filter unit 13. A relative large difference of the detected concentration of metallic elements may for instance indicate a relative good filtering of metallic elements by the filter unit 13, whereas a relative small difference of the detected concentration of metallic elements may indicate replacement or cleaning of the filter unit 13 may be required.

The detector unit 9 and the air sampling system are communicatively coupled to a control unit 11. The detected concentration, by the detector unit 9, of the metallic elements may, in use, be communicated to the control unit 11. The control unit 11 is communicatively coupled to the air ventilation system 5 and arranged for controlling said air ventilation system 5 taking into account the detected concentration and predetermined concentration values of metallic particles. The predetermined concentration values of the metallic particles may be stored on the control unit 11.

The indoor shooting range 1 further comprises an indication unit and a pressure detector 19, both communicatively coupled to said control unit 11. The indication unit, in the form of a display 17, is provided at a wall bounding said interior space 3. The display 17 is communicatively coupled to said control unit 11 and arranged to indicate to a user inside said interior space 3 a measure of said detected concentrations of metallic elements. The pressure detector 19 is provided for allowing a pressure drop over the filter unit 13 to be detected. A measure for the pressure drop across the filter unit 13 is provided on the display 17. By taking notice of the measure for the pressure drop across the filter unit 13 and/or the indicated measure of the detected concentrations of metallic elements a user inside the interior space 3 may obtain insight in the need for a replacement or cleaning of the filter unit 13 and/or the safety of the operation condition in the interior space.

The control unit 11 is further communicatively coupled to a person detector system of the indoor shooting range 1. The person detector system comprises detectors 27, 29 and 31 that are arranged for detection a location of a person in the interior space 3. Based on the detection of a person inside said interior space 3, the control unit 11 may control the air sampling system 21, 23, 25 for sampling air at a predetermined location corresponding with a location of the person detected in the interior space 3.

The invention claimed is:

1. Indoor shooting range (1) comprising an interior space (3) for firing ammunition, said indoor shooting range (1) comprising:
   an air ventilation system (5) arranged for providing said interior (3) space with a laminar flow of fresh air (7);
   a detector unit (9) arranged for detecting a concentration of metallic elements, in air in said interior space (3), originating from ammunition fired in said interior space (3) of said indoor shooting range (1), wherein said detector unit is arranged for detecting the concentration of at least one of lead, copper, aluminium, antimony, zinc, tin, manganese, bismuth, iron and nickel elements;
   a control unit (11), communicatively coupled to said air ventilation system (5) and said detector unit (9), for controlling said air ventilation system (5) taking into account a detected concentration, by said detector unit (9), of metallic elements originating from said ammunition fired in said interior space (3) for maintaining said concentration of said metallic elements in said interior space (3) below a predetermined value, wherein predetermined concentration values of metallic elements for the interior space (3) for firing ammunition are stored on the control unit; and
   an air sampling system (21, 23, 25), communicatively coupled to said detector unit (9) and said control unit (11), arranged for sampling air at predetermined locations in said interior space (3).

2. Indoor shooting range (1) according to claim 1, wherein said controlling of said air ventilation system (5) comprises controlling a velocity of said fresh air (7) in said interior space (3).

3. Indoor shooting range (1) according to claim 2, wherein said velocity of said fresh air (7) is in a range of 0.2 meters per second to 0.8 meters per second.

4. Indoor shooting range (1) according to claim 3, wherein said velocity of said fresh air (7) is in a range of 0.3 meters per second to 0.55 meters per second.

5. Indoor shooting range (1) according to claim 1, wherein said indoor shooting range (1) comprises a filter unit (13) for filtering metallic elements from air (15) exhausted from said interior space (3).

6. Indoor shooting range (1) according to claim 1, wherein said indoor shooting range (1) comprises an indication unit (17), communicatively coupled to said control unit (11), arranged for indicating a measure of said detected concentration to a user in said interior space (3).

7. Indoor shooting range (1) according to claim 6, further including a filter unit (13) for filtering metallic elements from air (15) exhausted from said interior space (3); and wherein said indoor shooting range (1) comprises a pressure detector (19), communicatively coupled to said control unit (11), arranged for detecting a pressure drop across said filter unit (13), wherein said indication unit (17) is arranged for indicating a measure of said pressure drop to a user in said interior space (3).

8. Indoor shooting range (1) according to claim 1, further including a filter unit (13) for filtering metallic elements from air (15) exhausted from said interior space (3); and wherein a predetermined location of said predetermined locations is such that said air (15) exhausted from said interior space (3) is sampled before said air (15) is exhausted from said interior space (3) and enters said filter unit (13) and wherein said detector unit (9) is coupled for fluid flow with said air sampling system (21, 23, 25) for detecting said concentration of metallic elements in said air (15) sampled at said predetermined location.

9. Indoor shooting range according to claim 1, further including a filter unit (13) for filtering metallic elements from air (15) exhausted from said interior space (3); and wherein a further predetermined location of said predetermined locations is such that said air (15) exhausted from said interior space (3) is sampled after said air (15) is exhausted from said interior space (3) and passes said filter unit (13) and wherein said detector unit (9) is coupled for fluid flow with said air sampling system (21, 23, 25) for detecting said concentration of metallic elements in said air (15) sampled at said further predetermined location.

10. Indoor shooting range (1) according to claim 1, wherein said indoor shooting range (1) comprises a person detector system (27, 29, 31), communicatively coupled to said control unit (11), for detecting a location of a person in said interior space (3), wherein said air sampling system (21, 23, 25) is arranged for sampling air at another predetermined location of said predetermined locations in said interior space (3) corresponding with a detected location of a person, by said person detector system (27, 29, 31).

11. Indoor shooting range (1) according to claim 1, wherein said control unit (11) is arranged for controlling of said air ventilation system (5) at a rate in the range of once per minute to once per 60 minutes.

12. Indoor shooting range (1) according to claim 11, wherein said control unit (11) is arranged for controlling of said air ventilation system (5) continuously.

13. Indoor shooting range according to claim 1, wherein the detector unit comprises an energy-dispersive X-ray spectroscope.

14. Indoor shooting range according to claim 13, wherein the energy-dispersive X-ray spectroscope is configured to analyze the air of the interior space sampled at predetermined locations in said interior space via multiple air intake nozzles of the air sampling system.

15. Indoor shooting range according to claim 1, wherein the air ventilation system includes a condition unit for conditioning the fresh air before providing fresh air at a first side into the interior space.

16. Indoor shooting range according to claim 1, further including a filter unit for filtering metallic elements from air exhausted from said interior space; a first air intake nozzle such that air exhausted from the interior space is sampled before passing through the filter unit; and a second air intake nozzle such that air is sampled after passing through the filter unit.

17. Indoor shooting range according to claim 16, wherein the detector unit determines a difference in concentration of metallic elements received by the first air intake nozzle and the second air intake nozzle to provide a measure of the operational condition of the filter unit.

18. Indoor shooting range according to claim 17, further comprising a person detector system with a plurality of detectors arranged for detection of a person in the interior space.

19. Indoor shooting range according to claim 18, wherein the control unit controls the air sampling system to sample air at a location corresponding with a location of a person in the interior space detected by the person detector system.

\* \* \* \* \*